March 31, 1953 C. R. McGHEE 2,633,256
LAP HANDLING APPARATUS
Filed May 3, 1949 3 Sheets-Sheet 1
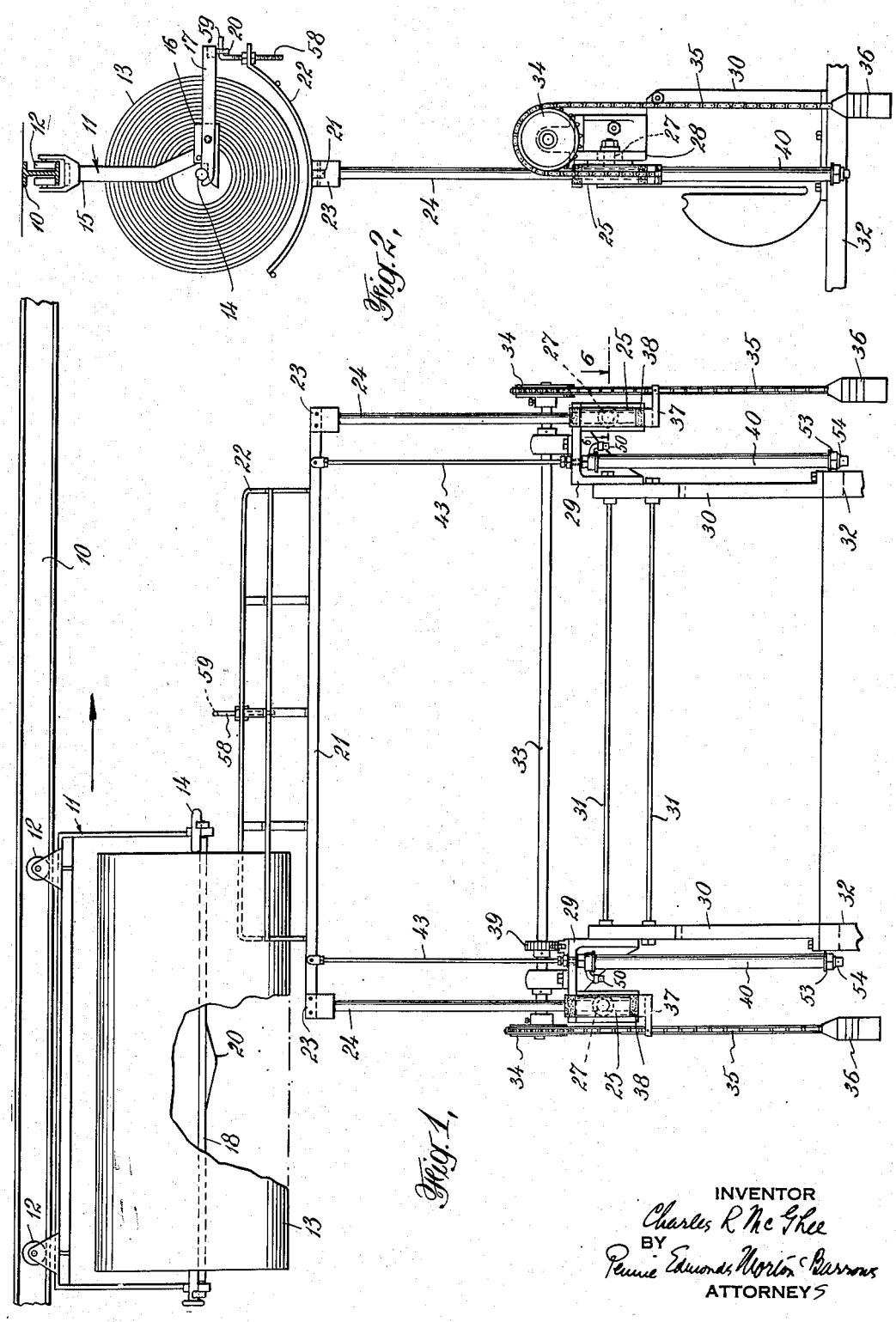
INVENTOR
Charles R McGhee
BY
Pennie Edmonds, Morton & Barrows
ATTORNEYS March 31, 1953 C. R. McGHEE 2,633,256
LAP HANDLING APPARATUS
Filed May 3, 1949 3 Sheets-Sheet 2
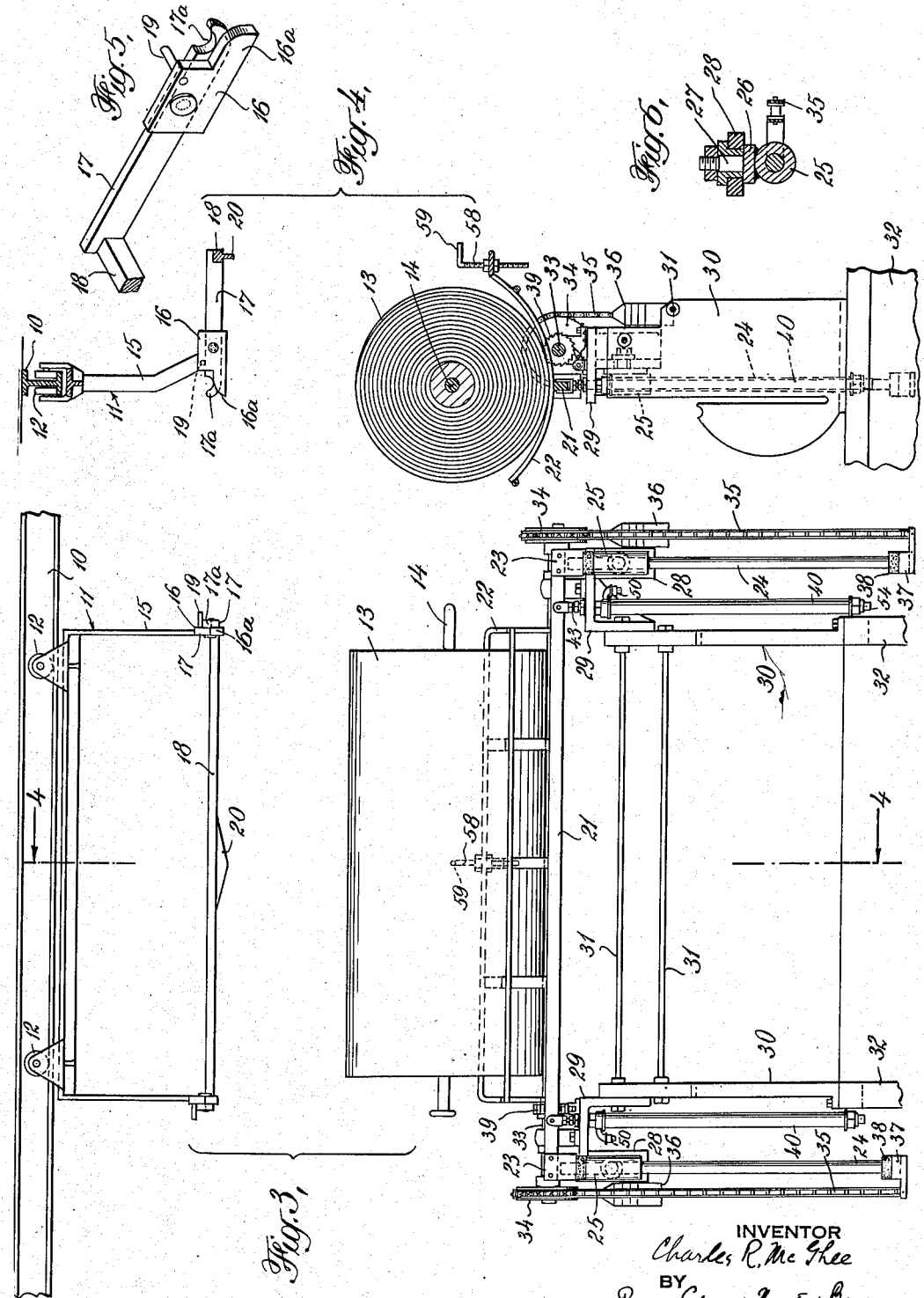
INVENTOR
Charles R. McGhee
BY
Pennie Edmonds Morton Barrows
ATTORNEYS

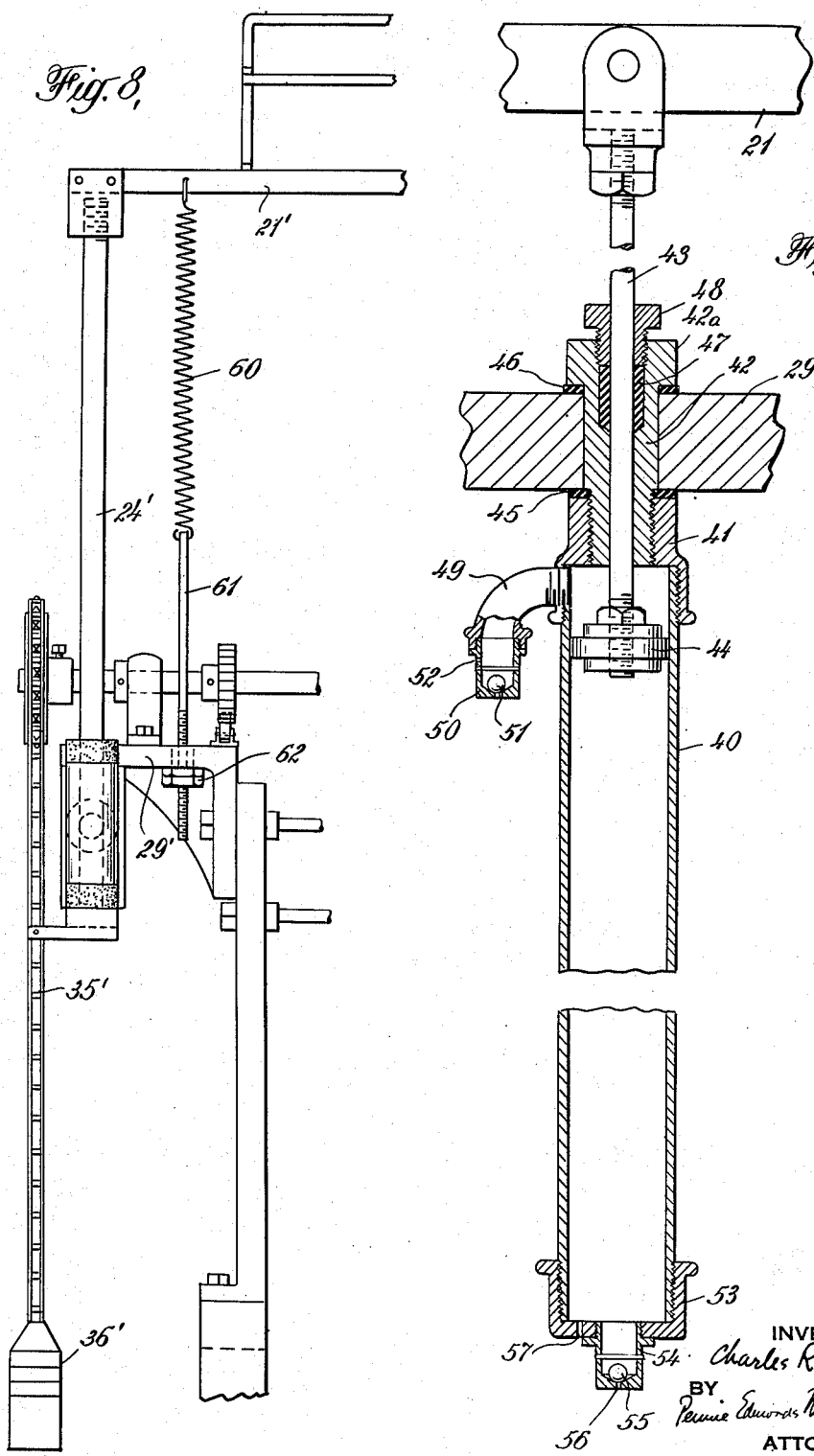

Patented Mar. 31, 1953

2,633,256

UNITED STATES PATENT OFFICE 2,633,256

LAP HANDLING APPARATUS

Charles R. McGhee, Gastonia, N. C., assignor to Borden Mills, Incorporated, Boston, Mass., a corporation of Massachusetts Application May 3, 1949, Serial No. 91,163

7 Claims. (Cl. 214—60)

This invention relates to conveying systems, which include a plurality of carriages continuously moved along a track, and is concerned more particularly with an overhead conveying system of the type referred to, by which articles can be transported on carriages to a series of stations and the article on a carriage can be automatically discharged from the carriage at a selected station and lowered to a convenient height. The new system may be employed for various purposes and is especially useful in textile mills for conveying laps from the picker room to the card room and delivering the laps at the respective cards. A form of the new system for use in transporting laps will, accordingly, be illustrated and described in detail for purposes of explanation, although it is to be understood that the utility of the invention is not limited to that specific application.

In the operation of a textile mill engaged, for example, in cotton manufacture, the rolls of cotton called "laps," which are produced in the picker room, have commonly been conveyed on trucks to the card room and then manually removed from the trucks and placed on the lap stands of the cards. Transporting the laps by truck requires the services of one or more men and the trucks take up space in the aisles and their use occasionally results in personal injuries, as well as damage to machinery and the floors. The transportation of the laps by truck is, accordingly, open to serious objections and it represents a substantial item in the cost of manufacture.

The present invention is directed to the provision of a conveying system, which overcomes the disadvantages involved in the use of trucks for transporting the laps and, among other things, reduces costs. The system of the invention includes an endless overhead track, along which a plurality of carriages are moved at a uniform rate by any suitable means, as, for example, by a conventional motor driven pusher. The track makes a circuit through the picker room and through the card room, where it extends at the proper height over and at the rear of each line of cards. In the picker room, the carriages are loaded with laps and the loaded carriages then travel into the card room and along the cards. At each card, there is a receiving structure disposed adjacent the lap stand of the card below the track, the structure being movable between upper and lower positions. The structure includes a cradle for receiving a lap discharged from the carriage and is provided with means operative, when the structure is in its elevated position, to release a lap from the next loaded carriage passing the station and discharging the lap into the cradle of the structure. The structure then moves downward by gravity and at a controlled speed, until it comes to rest at a convenient height for removal of the lap from the cradle. In the new system, the laps are transported at such a height as not to interfere with the freedom of movement of the card operators, and the system carries a sufficient supply of laps, so that the requirements of each card may be fulfilled without undue delay. The removal of the lap from a carriage and the lowering of the lap to a convenient height for insertion in the card is fully automatic, so that the amount of labor required in handling the laps at the rear ends of the cards is greatly reduced.

For a better understanding of the invention, reference may be made to the accompanying drawing, in which Fig. 1 is a view in side elevation with parts broken away, showing a loaded carriage on the track approaching a receiving structure in elevated position and ready to remove the lap from the carriage;

Fig. 2 is an end view of the apparatus shown in Fig. 1;

Fig. 3 is a view similar to Fig. 1 but showing the lap receiving structure in its lowered position;

Fig. 4 is a sectional view on the line 4—4 of Fig. 3;

Fig. 5 is a view in perspective of a part of the carriage;

Fig. 6 is a sectional view on the line 6—6 of Fig. 1;

Fig. 7 is a view partly in vertical section and partly in elevation through retarding means on the receiving structure; and Fig. 8 is a fragmentary elevational view showing a receiving structure with modified retarding means.

The system illustrated in the drawings includes an overhead track 10, which may be a rail of I-beam form and extends from the loading stations to a plurality of receiving stations and then back. In a system used for conveying laps in a textile mill, the track runs past the delivery ends of the pickers and into the carding room past the rear ends of all the cards, whence it returns to the starting point. A plurality of carriages are mounted for movement along the track and, for lap handling purposes, each such carriage may include a frame 11 of inverted U-form provided at its ends with pairs of rollers 12, which run on the lower flange of the track on opposite sides of the web. The carriages are propelled along the track in any suitable way, as, for example, groups of the carriages may be advanced by a motor driven pusher traveling continuously along the track.

The laps 13 are large rolls of cotton wound on a headed lap rod 14 and the laps are supported in the carriages on the lap roads. For this purpose, the downwardly extending leg 15 at each end of the carriage is provided at its lower end with a plate 16 having a forwardly extending lug 16a, the upper surface of which is curved forwardly and downwardly. An arm 17, provided at its forward end with a notch 17a in its upper surface, is pivoted on each plate 16 in such manner that the bottom of the notch may lie approximately in alignment with the top of lug 16a on the plate. The arms 17 extend rearwardly from the plates and the rear ends of the arms are connected by a bar 18. Each plate is provided with a stop pin 19, and the mounting of the arms 17 and their connecting bar 18 is such that normally the arms engage the stop pins 19 from beneath. When a lap is mounted in the carriage, the ends of the lap rod 14 rest on top of lugs 16a on plates 16 and also lie within notches 17a on arms 17. The arms act as latches, in that, so long as the arms engage their stop pins, the lap rod is held within notches 17a and cannot roll off the top of lugs 16a. Midway between its ends, the bar 18 is provided with a cam plate 20, by means of which the bar and arms may be swung to free the lap rod from notches 17a and permit the rod to roll off lugs 16a to release the lap from the carriage.

A receiving structure or rack is mounted at the back of each card adjacent the lap stand of the card and below the track and the structure includes a cross-bar 21, on top of which is mounted a framework 22 forming a cradle curved to receive a lap. Bar 21 is attached by plates 23 to the upper ends of a pair of vertical rods 24, which are movable lengthwise in tubular guides 25 attached to plates 26. Plates 26 are secured to the ends of horizontal pivots 27 in plates 28 attached to brackets 29 bolted to spaced side frame members 30. Members 30 are connected by tie rods 31 and mounted on suitable supports 32. Each bracket 29 carries a bearing, in which runs a horizontal shaft 33, and sprocket wheels 34 are mounted fast on the shaft at each end thereof. A chain 35 is trained about each sprocket wheel and a weight 36 is attached to one end of each chain, while the other end of the chain is connected to a collar 37 on the lower end of a rod 24. The collar is provided on its upper face with a cushioning abutment 38. With the arrangement described, the weights tend to fall and thereby act through the chains to raise the receiving structure comprising rods 24, cross-bar 21, and cradle 22, until abutments 38 engage the lower ends of guides 25. Shaft 33 carries a ratchet wheel 39, which may be engaged by a pawl to prevent elevation of the carriage by the weights and thus hold the structure in its down position.

The vertical movements of the receiving structure are retarded by dash-pot means acting on cross-bar 21 at each end thereof. Each such dash-pot means includes a cylinder 40 threaded at its upper end into a coupling 41, which is threaded upon the end of a guide bushing 42 extending through an opening in a bracket 29. Above the bracket, the bushing has a collar 42a with an enlarged opening therethrough. A rod 43 connected to cross-bar 21 near one end thereof passes through the bushing and into cylinder 40 and a piston 44 is mounted on the lower end of the rod within the cylinder. Packing washers 45, 46 are interposed between bracket 29 and coupling 41 and collar 42a, respectively, and escape of air from the cylinder around the rod is prevented by a packing 47 encircling the rod within the enlarged bore of collar 42a and held in place by a gland nut 48. An outlet elbow 49 leads from the interior of the cylinder 40 at the upper end thereof and a ball check valve 50 is mounted at the end of the elbow. The valve includes a ball 51 normally seated to close an orifice at the end of the valve and has a small escape orifice 52, which is open at all times. At its lower end, cylinder 40 is closed by a cap 53 threaded thereon and having an opening in its lower end, in which is threaded ball check valve 54 having a ball 55 normally closing the outlet orifice 56 from the valve. The cap is also provided with a normally open escape orifice 57. With the construction described, the movements in either direction of pistons 44 in cylinders 40 cause air to be expelled through the escape orifices at the upper or lower ends of the cylinders, and, as the orifices are small, the cylinders and pistons act as dash-pots retarding the movements of the receiving structure.

One side of the cradle carries a rod 58 mounted thereon for vertical adjustment and having a trip arm 59 extending laterally from its upper end. When the receiving structure is in its elevated position, arm 59 lies in the path of cams 20 on bars 18 on carriages 11 moving along the track. When a cam on a carriage engages the arm, the bar 18 carrying the cam is raised, and arms 17 connected to the bar are swung, so that their notched ends drop below the tops of lugs 16a on plates 16 on the carriage. The lap rod of the lap supported by the carriage can then roll off the lugs, so that the lap drops into the cradle of the structure.

In the modified construction shown in Fig. 8, the downward movement of a receiving structure, in which a lap has been deposited, is not retarded, but weights 36' attached to chains 35' connected to the vertical rods 24' of the structure are of such size that the downward movement of the structure with a lap in its cradle is relatively slow. In order to control the upward movement of the structure when it is to be raised to receive a new lap, a spring 60 is mounted at each end of the structure, one end of the spring being attached to the cross-bar 21' of the structure and the other to a rod 61, which passes through an opening in one of the brackets 29'. The rod has nuts 62 threaded on its lower end and, as the structure rises, the nuts on the rods engage the lower sides of brackets 29', before the structure has reached its top position. The final rising movement of the structure then causes springs 60 to be stretched and this retards the movement.

In the operation of the conveying system described, the carriages moving through the picker room are loaded with laps and then advanced along the track through the card room and past the rear ends of the cards. When a card does not need a lap, its receiving structure is held in lower position either by the weight of a lap resting on the cradle of the structure or, if the cradle is empty, by engagement of the pawl with the ratchet wheel 39 on the shaft 33 carrying the sprocket wheels 34, about which chains 35 are trained. A lap is ordinarily required at a particular card whenever the cradle of the receiving structure at that card is empty and, unless prevented from doing so, the structure will be raised by the falling of its weights 36, whenever the lap deposited in the cradle is removed therefrom. If, for any reason, the structure is held down by engagement of the pawl with the ratchet wheel after removal of a lap from the cradle, the disengagement of the pawl from the ratchet wheel will permit the weights to raise the structure. When the structure is elevated, the trip arm 59 on rod 58 attached to the cradle of the structure lies in the path of cams 20 on the carriages, and, when the next loaded carriage passes the card, the engagement of its cam 20 with arm 59 causes the lap to be released from the carriage and it drops into cradle 22 of the receiving structure. With the added weight of the lap, the receiving structure is able to overcome the action of the weights and the structure, accordingly, begins to fall. The downward movement may be retarded by the dash-pots or, if they are not used, by employing weights of appropriate size. When the structure is in its lowermost position, the operative may lock it by engaging the pawl with ratchet wheel 39, and the structure is ordinarily so locked during removal of the lap and until another lap is required. Thereupon, the ratchet wheel is released and the structure automatically rises. Its upward movement is either controlled by means of the dash-pots or cushioned by the action of springs 60. The structure finally comes to rest in its uppermost position with the cushioning abutments on the vertical rods on the structure in engagement with the lower ends of the tubular guides for the rods. During the time that the receiving structure at any card carries a lap and is held down by the weight of the lap, the trip arm 59 of that structure is below the path of travel of the releasing cams 20 on the carriages traveling along the conveyor, so that the carriages pass by the card without discharging a lap into the cradle of the receiving structure at the card. When the lap is removed from the cradle and the structure is raised to its upper position by the action of the weights, the trip arm moves into position to engage the releasing cam on the carriage next passing over the structure.

I claim:

1. A picker lap conveyor system for maintaining a supply of picker laps at a battery of cards, comprising a receiving rack arranged adjacent the lap stand of each card in said battery, an overhead conveyor means spaced above said receiving racks, and at least one picker lap carrying frame disposed for travel on said overhead conveyor means, said receiving racks comprising a cradle, yieldable supporting means for said cradle, and a trip arm associated with said cradle, said yieldable supporting means normally positioning said cradle at a raised position with said trip arm disposed for actuating said carrying frame to transfer a picker lap to said cradle, but allowing shifting of said cradle to a depressed position under the load of a picker lap whereby said trip arm is displaced from the path of said carrying frame as long as said cradle is loaded with a picker lap.

2. A picker lap conveyor system for maintaining a supply of picker laps at a plurality of cards, comprising a receiving structure adjacent each of the cards, the structure being mounted for movement between upper and lower positions and including a cradle provided with a trip arm, overhead conveyor means spaced above the receiving structures, at least one picker lap carrier disposed for travel on said conveyor means, said carrier having releasable means for carrying a picker lap, and yieldable means associated with each receiving structure and acting to raise said structure, when there is no lap in the cradle thereof, to its upper position with the trip arm on the cradle in position to actuate the picker lap carrying means on said carrier to release the lap carried thereby into the cradle, said yieldable means allowing said structure to move to its lower position under the load of the picker lap in the cradle, whereby said trip arm is displaced from the path of said releasable carrying means on the carrier so long as said cradle is loaded with a picker lap.

3. A picker lap conveyor system for maintaining a supply of picker laps at a plurality of cards, comprising a receiving structure adjacent each of the cards, the structure being mounted for movement between upper and lower positions and including a cradle provided with a trip arm, overhead conveyor means spaced above the receiving structures, at least one picker lap carrier disposed for travel on said conveyor means, said carrier having releasable means for carrying a picker lap, yieldable means associated with each receiving structure and acting to raise said structure, when there is no lap in the cradle thereof, to its upper position with the trip arm on the cradle in position to actuate the picker lap carrying means on said carrier to release the lap carried thereby into the cradle, said yieldable means allowing said structure to move to its lower position under the load of the picker lap in the cradle, whereby said trip arm is displaced from the path of said releasable carrying means on the carrier so long as said cradle is loaded with a picker lap, and means for restricting the speed of downward movement of each receiving structure under the load of a picker lap in its cradle.

4. A picker lap conveyor system for maintaining a supply of picker laps at a plurality of cards, comprising a receiving structure adjacent each of the cards, the structure being mounted for movement between upper and lower positions and including a cradle provided with a trip arm, overhead conveyor means spaced above the receiving structures, at least one picker lap carrier disposed for travel on said conveyor means, said carrier having releasable means for carrying a picker lap, yieldable means associated with each receiving structure and acting to raise said structure, when there is no lap in the cradle thereof, to its upper position with the trip arm on the cradle in position to actuate the picker lap carrying means on said carrier to release the lap carried thereby into the cradle, said yieldable means allowing said structure to move to its lower position under the load of the picker lap in the cradle, whereby said trip arm is displaced from the path of said releasable carrying means on the carrier so long as said cradle is loaded with a picker lap, and dash-pot means for restricting the speed of downward movement of each receiving structure under the load of a picker lap in its cradle.

5. A picker lap conveyor system for maintaining a supply of picker laps at a plurality of cards, comprising a receiving structure adjacent each of the cards, the structure being mounted for movement between upper and lower positions and including a plurality of vertical rods and a cradle attached to the rods and provided with a trip arm, fixed guides at each card, in which the rods of the structure associated with that card are movable, overhead conveyor means spaced above the receiving structures, at least one picker lap carrier disposed for travel on said conveyor means, said carrier having releasable means for carrying a picker lap, and yieldable means associated with each receiving structure and acting to raise said structure, when there is no lap in the cradle thereof, to its upper position with the trip arm on the cradle in position to actuate the picker lap carrying means on said carrier to release the lap carried thereby into the cradle, said yieldable means allowing said structure to move to its lower position under the load of the picker lap in the cradle, whereby said trip arm is displaced from the path of said releasable carrying means on the carrier so long as said cradle is loaded with a picker lap.

6. A picker lap conveyor system for maintaining a supply of picker laps, each wound upon a lap pin, at a plurality of cards, which comprises a receiving structure adjacent the feed end of each of the cards, the structure being mounted for movement between upper and lower positions and including a cradle provided with a trip arm, overhead conveyor means spaced above the receiving structures, at least one picker lap carrier disposed for travel on said conveyor means, said carrier having releasable means for supporting a picker lap by engagement with the lap pin thereof, said releasable means including members mounted for rotational movement, and yieldable means associated with each receiving structure and acting to raise said structure, when there is no lap in the cradle thereof, to its upper position with the trip arm on the cradle in position to actuate the picker lap supporting means on the carrier to release the lap carried thereby into the cradle, said yieldable means allowing the structure to move to its lower position under the load of the picker lap in the cradle, whereby said trip arm is displaced from the path of said releasable supporting means on the carrier so long as said cradle is loaded with a picker lap.

7. A conveyor system for maintaining a supply of articles of like size and weight at a plurality of stations, where said articles are to be used, which comprises a receiving structure adjacent each station and mounted for movement between upper and lower positions, each structure including a receptacle for receiving and holding an article, said receptacle being moveable with the remainder of the structure, a trip element, mounted on the structure to move therewith, overhead conveyor means spaced above the receiving structures, at least one article carrier disposed for travel on said conveyor means and having releasable means for carrying an article, and yieldable means associated with each receiving structure and acting to raise said structure, when there is no article in the receptacle of the structure, to its upper position with the trip element on said structure in position to actuate the releasable carrying means on said carrier to release the article carried thereby into said receptacle, said yieldable means allowing said structure to move to its lower position under the load of an article in the receptacle of said structure, whereby said trip arm is displaced from the path of said releasable carrying means on the carrier so long as said receptacle is loaded with an article.

CHARLES R. McGHEE.

REFERENCES CITED

The following references are of record in the file of this patent:

UNITED STATES PATENTS

| Number | Name | Date |
|---|---|---|
| 1,731,095 | Draeger | Oct. 8, 1929 |
| 1,831,283 | Baker | Nov. 10, 1931 |
| 2,012,397 | Mattler | Aug. 27, 1935 |
| 2,431,618 | Rayburn et al. | Nov. 25, 1947 |
| 2,546,373 | Rayburn | Mar. 27, 1951 |
| 2,546,374 | Rayburn et al. | Mar. 27, 1951 |
| 2,588,942 | Still | Mar. 11, 1952 |